(12) United States Patent
Cody et al.

(10) Patent No.: US 10,939,783 B2
(45) Date of Patent: Mar. 9, 2021

(54) FOOD PROCESSOR LID

(71) Applicant: SHARKNINJA OPERATING LLC, Needham, MA (US)

(72) Inventors: Thomas Edward Kingsborough Cody, St. Margaret's (GB); James Richard Potter, Windsor (GB); Oliver Henry Sherston Chambers, London (GB); Andrew David Roberts, Kenilworth (GB)

(73) Assignee: SHARKNINJA OPERATING LLC, Needham, MA (US)

( * ) Notice: Subject to any disclaimer, the term of this patent is extended or adjusted under 35 U.S.C. 154(b) by 320 days.

(21) Appl. No.: 15/879,124

(22) Filed: Jan. 24, 2018

(65) Prior Publication Data

US 2018/0213980 A1 Aug. 2, 2018

Related U.S. Application Data

(60) Provisional application No. 62/451,166, filed on Jan. 27, 2017.

(51) Int. Cl.
*A47J 43/07* (2006.01)
*A47J 43/046* (2006.01)
*A47J 36/10* (2006.01)

(52) U.S. Cl.
CPC .......... *A47J 43/0772* (2013.01); *A47J 36/10* (2013.01); *A47J 43/046* (2013.01); *A47J 43/07* (2013.01); *A47J 43/0716* (2013.01)

(58) Field of Classification Search
CPC .......... A47J 36/10; A47J 43/046; A47J 43/07; A47J 43/0716; A47J 43/0772
See application file for complete search history.

(56) References Cited

U.S. PATENT DOCUMENTS

| 2002/0038804 A1* | 4/2002 | Gourand ............ A47J 27/21175 220/835 |
| 2012/0024993 A1 | 2/2012 | Audette et al. |
| 2015/0136769 A1 | 5/2015 | Quinn et al. |

FOREIGN PATENT DOCUMENTS

| EP | 2502530 A1 | 9/2012 |
| WO | 2015068078 A1 | 5/2015 |

OTHER PUBLICATIONS

PCT ISR Written Opinion; International Application No. PCT/US2018/015053; International Filing Date: Jan. 24, 2018; dated May 2, 2018; pp. 1-6.

(Continued)

*Primary Examiner* — Christopher J Besler
*Assistant Examiner* — Christine Bersabal
(74) *Attorney, Agent, or Firm* — Cantor Colburn LLP

(57) ABSTRACT

A lid of a food processing system selectively receivable by a container of the food processing system includes a lid body defining a cavity within the lid body, a locking assembly at least partially disposed within the cavity and an actuator associated the said lid body and the locking assembly. The locking assembly is movable from an unlocked position to a locked position in response to application of a first force applied to the actuator. The locking assembly is movable from the locked position to the unlocked position in response to application of a second force applied to said actuator, the first force and said second force being applied in a same direction.

10 Claims, 13 Drawing Sheets

(56) References Cited

OTHER PUBLICATIONS

PCT Notification of Transmittal of the International Search Report; International Application No. PCT/US2018/015053; International Filing Date: Jan. 24, 2018; dated May 2, 2018; pp. 1-6.

* cited by examiner

FOOD PROCESSOR LID

CROSS-REFERENCE TO RELATED APPLICATIONS

This application claims the benefit of U.S. Application Ser. No. 62/451,166, filed Jan. 27, 2017, which is incorporated herein by reference in its entirety.

BACKGROUND

The disclosure relates generally a food processing system, and more particularly, to a connection between a container of the food processing system and a lid of the food processing system.

There are a variety of types of food processors available designed to mix, cut, blend, and otherwise process food. One type of conventional food processor includes a container, a lid, and a rotary blade located adjacent a bottom of the container. The food processor additionally includes a base which houses a motor. When the container is placed on the base, the motor is configured to drive the rotary blade about an axis to mix, cut, or blend the food within the container.

BRIEF DESCRIPTION

According to an embodiment, a lid of a food processing system selectively receivable by a container of the food processing system includes a lid body defining a cavity within the lid body, a locking assembly at least partially disposed within the cavity and an actuator associated the said lid body and the locking assembly. The locking assembly is movable from an unlocked position to a locked position in response to application of a first force applied to the actuator. The locking assembly is movable from the locked position to the unlocked position in response to application of a second force applied to said actuator, the first force and said second force being applied in a same direction.

In addition to one or more of the features described above, or as an alternative, in further embodiments said locking assembly is spring biased towards said unlocked position.

In addition to one or more of the features described above, or as an alternative, in further embodiments said locking assembly further comprises at least one lock operably coupled to said actuator.

In addition to one or more of the features described above, or as an alternative, in further embodiments application of said first force and said second force causes said actuator to move about a first axis and said at least one lock to move about a second axis, said second axis being different than said first axis.

In addition to one or more of the features described above, or as an alternative, in further embodiments said first axis and said second axis are substantially perpendicular.

In addition to one or more of the features described above, or as an alternative, in further embodiments said at least one lock is configured to rotate about said second axis.

In addition to one or more of the features described above, or as an alternative, in further embodiments when said lid is mounted to the container, said at least one lock is engagable with an interlock of the food processing system.

In addition to one or more of the features described above, or as an alternative, in further embodiments when said locking assembly is in said unlocked position, said actuator is offset from an upper surface of said housing by a first distance and when said locking assembly is in said locked position said actuator is offset from said upper surface of said housing by a second distance, said first distance being greater than said second distance In addition to one or more of the features described above, or as an alternative, in further embodiments comprising a mechanism for selectively retaining said actuator when said locking mechanism is in said locked position.

In addition to one or more of the features described above, or as an alternative, in further embodiments said lid is receivable by the container when said locking assembly is in both a locked position and an unlocked position.

According to another embodiment, a method of mounting a lid to a container of a food processing assembly includes applying a force to an actuator of the lid such that the actuator moves along a first axis, moving a lock operably coupled to the actuator along a second axis, different from the first axis such that an elongated engagement member of the lock is receivable by the container, and coupling the lid to the container.

In addition to one or more of the features described above, or as an alternative, in further embodiments comprising selectively retaining said actuator in an actuated position in response to movement of said actuator along said first axis.

In addition to one or more of the features described above, or as an alternative, in further embodiments coupling the lid to the container further comprises receiving said engagement member within an opening of the container.

In addition to one or more of the features described above, or as an alternative, in further embodiments receiving said engagement member within said opening further comprises applying a force to an interlock to provide power to a motorized unit of the food processing system.

In addition to one or more of the features described above, or as an alternative, in further embodiments coupling the lid to the container occurs prior to applying said force to said actuator of said locking assembly.

In addition to one or more of the features described above, or as an alternative, in further embodiments coupling the lid to the container occurs simultaneously or after applying said force to said actuator of said locking assembly.

In addition to one or more of the features described above, or as an alternative, in further embodiments coupling the lid to the container occurs after said lock is moved such that said elongated engagement member is receivable by said container.

In addition to one or more of the features described above, or as an alternative, in further embodiments comprising applying another force to said actuator to unlock the lid from the container, said another force and said force being oriented in a same direction.

In addition to one or more of the features described above, or as an alternative, in further embodiments moving said actuator along said first axis exposes or hides a visible indicator.

According to another embodiment, a food processing system includes a base and a container for selective coupling to the base. The container is sized to receive food to be processed. A lid for selective coupling to said container includes an actuator and a locking assembly. The locking assembly is movable from an unlocked position to a locked position in response to application of a first force to said actuator. The locking assembly is movable from said locked position to said unlocked position in response to application of a second force to said actuator, said first force and said second force being applied in a same direction.

These and other advantages and features will become more apparent from the following description taken in conjunction with the drawings.

BRIEF DESCRIPTION OF THE DRAWING

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
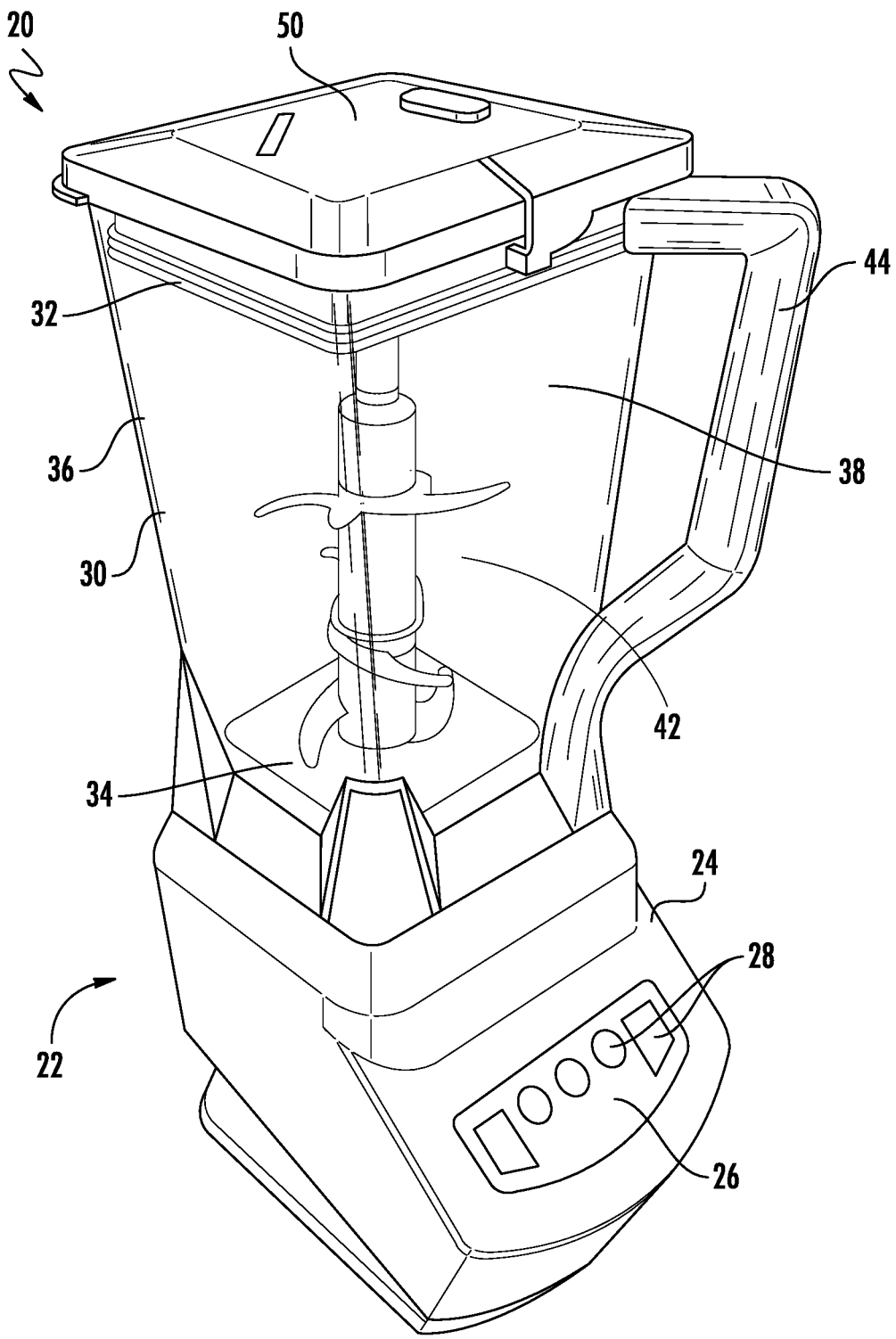
FIG. 1 is a perspective view of an example of a food processing system.

FIG. 1 illustrates view of an example of a food processing system 20 according to an embodiment of the present invention. The processing food system 20 can be adapted to perform any food processing or blending operation including as non-limiting examples, dicing, chopping, cutting, slicing, mixing, blending, stirring, crushing, or the like. The illustrated food processing system 20 includes a base 22 having a body or housing 24 within which a motorized unit (not shown) and at least one controller (not shown) are located. The base 22 includes at least one rotary coupling (not shown) for example, driven by the motorized unit within the body 24. The base 22 additionally includes a control panel or user interface 26 including one or more buttons or other input devices 28 for turning the motorized unit on and off and for selecting various modes of operation, such as pulsing, blending, or continuous food processing for example.

Figure 2:
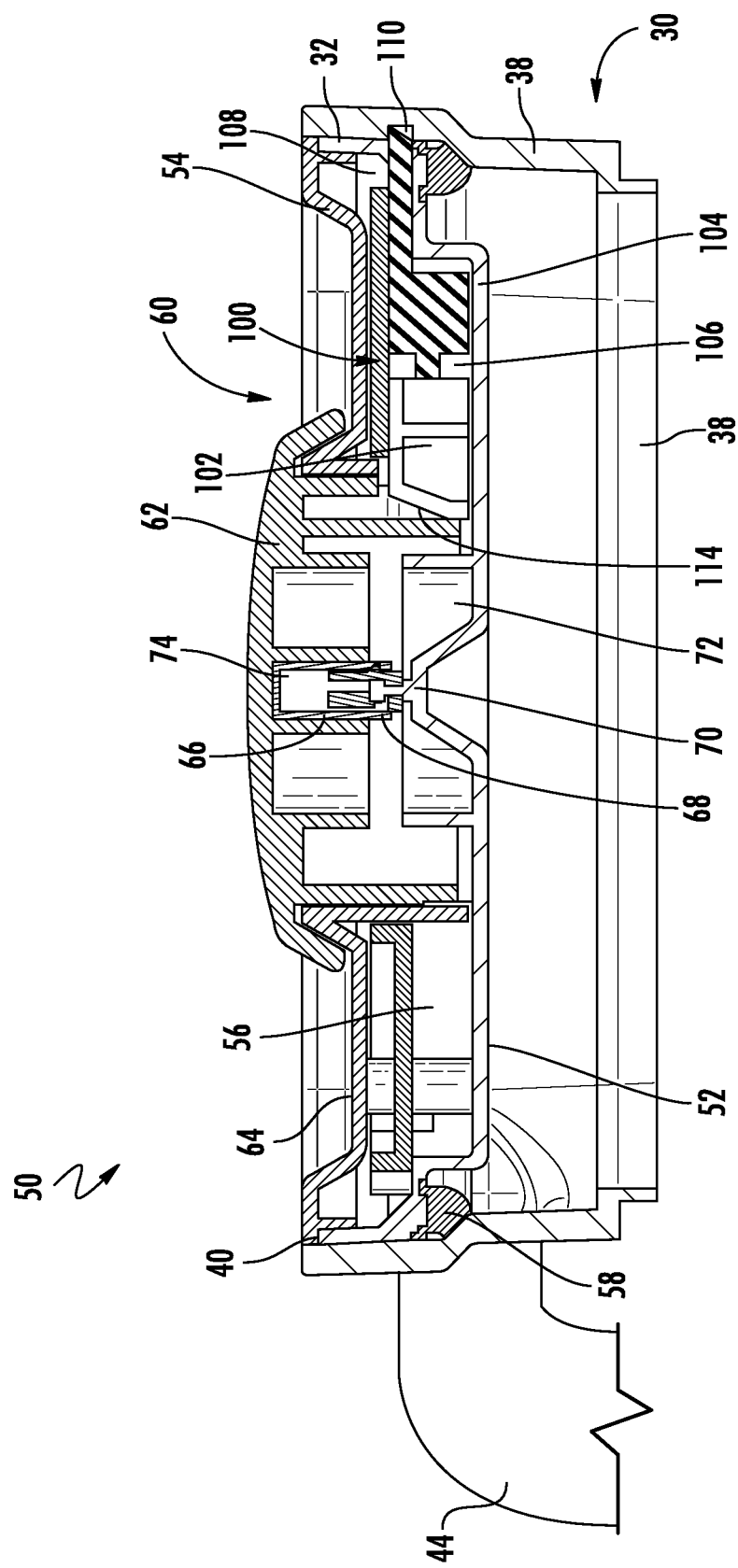
FIG. 2 is a cross-sectional view of a lid having a locking assembly according to an embodiment.
Figure 3:
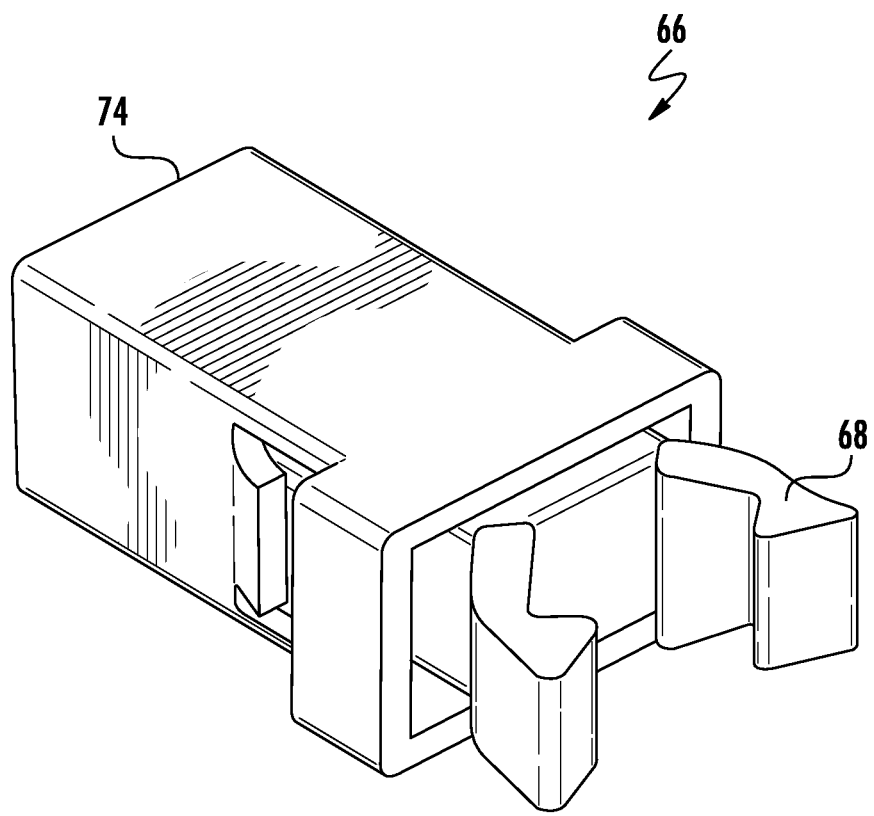
FIG. 3 is an example of a mechanism for selectively retaining an actuator of the lid in an actuated position according to an embodiment.

The food processing system 20 additionally includes a container 30 adapted (e.g. sized and dimensioned) to receive one or more food products therein to be processed. The container 30 generally includes a top 32, a bottom 34, and one or more walls 36 extending there between to define an interior chamber 38 within which food products are placed and processed. The top 32 of the container 30 includes an opening 40 (FIG. 2) that provides access for the one or more food items into the chamber 38. The bottom 34 of the container 30 is generally closed such that food products contained within the chamber 38 are unable to escape there through.

A rotatable blade assembly 42 is positioned within the chamber 38 to facilitate processing and/or the blending of food products. A driven coupler (not shown) associated with the rotatable blade assembly 42 is mounted adjacent an underside of the bottom of the container 30. In an embodiment, as shown in FIG. 1, the container 30 is a conventional container wherein the rotatable blade assembly 42 is integrally formed with the bottom 34 of the container 30. However, embodiments where the rotatable blade assembly 42 is removably coupled to a spindle or other support (not shown) extending from the bottom of the container 30 are also contemplated herein.

The base 22 is adapted to couple with the container 30 such that when the container 30 is installed thereon, the motorized unit and the rotatable blade assembly 42 are mechanically coupled, for example via engagement between the drive coupler and the driven coupler. As a result, the motorized unit can be adapted to drive rotation of the rotatable blade assembly 42 about an axis to perform one or more food processing and/or blending operations when one or more input devices 29 of a user interface 28 are actuated.

Depending on the type of container 30 being used, aspects of the present invention are directed to a food processor system 20 including a container 30 that may be slidably or rotatably attached to the base 22. However, it should be understood that containers 30 that connect to the base 22 in a different manner are also contemplated herein. In one embodiment, the sliding and/or rotational movement of the container 30 relative to the base 22 is in a direction that is substantially perpendicular to the downward movement of the container 30 onto the base 22. The container 30 may additionally be locked to the base 22.

A lid 50 is configured to attach to the top 32 of the container 30 prior to operation of the food processing system 20 to prevent the food items within the chamber 38 from spilling during a food processing operation. The lid 50 may be simply press-fit into the opening 40 at the top of the container to cover the chamber 38. In other embodiments, the lid 50 may be may configured to lock to the container 30. For example, the lid 50 is coupled to the container 30 by moving the lid 50 downwardly onto the container 30 in a direction along the axis defined by the rotatable blade assembly 42. When the lid 50 is aligned with and coupled to the top 32 of the container 30, an additional operation may be used to lock the lid 50 to the container 30.

With reference now to FIGS. 2-13, a lid 50 of the food processing assembly 20 is illustrated in more detail. The lid 50 includes a lower housing 52 having a shape generally complementary to the interior of the container 30 adjacent the first end 32. As shown, the lower housing 52 is generally hollow and may be formed from a food safe material, such as via an injection molding process for example. An upper housing 54 is coupled to the lower housing 52 to define a cavity 56 between the upper and lower housings 52, 54. A gasket 58 may extend about a periphery of the lower housing 52 to seal the contents within the chamber 38 when the lid 50 is coupled to the container 30.

The lid 50 includes a locking assembly 60 for selectively locking the lid 50 to the container 30. An exposed button or actuator 62 movable along an axis between a first unactuated position and a second actuated position is associated with the locking assembly 60. In an embodiment, when the button 62 is in the unactuated position, the button 62 is generally raised relative to the upper surface 64 of the lid 50, and when the button 62 is in the actuated position, the button 62 is generally flush with the upper surface 64 of the lid 50. Alternatively, the button 62 may be generally raised relative to the upper surface 64 of the lid 50 when the button 62 is in the actuated position. However, in such embodiments, the distance between the button 62 and the upper surface 64 of the lid 50 is less when the button 62 is in the actuated position than in the unactuated position. Further, in some embodiments, the button 62 includes a window for indicating to a user when the lid 50 is in a locked configuration. In an embodiment, the window may be back sprayed such that an icon or other indicator is only visible through the window when the window is directly adjacent the icon.

A mechanism 66 is operably coupled to the button 62 and the lid 50 to selectively retain the button 62 in the actuated position. In the non-limiting embodiment of FIGS. 2 and 3, the mechanism 66 is a push-push mechanism having a first end 68 engaged with a post or pin 70 extending upwardly from an inner surface 72 of the lower housing 52 and a second end 74 coupled to the button 62. When a generally vertical downward force is applied to the unactuated button 62, at least a portion of the button 62 is slidably received within the cavity 58. This movement of the button 62 compresses the internal biasing mechanism (not shown) of the push-push mechanism 66, causing the mechanism 66 to lock in place and retain the button 62 in the actuated position. Application of another generally vertical downward force to the button 62, now in the actuated position, results in further compression of the internal biasing mechanism, thereby allowing the push-push mechanism 66 to release. The biasing force of the biasing mechanism causes the button 62 to translate vertically, back to the unactuated position.

Figure 4:
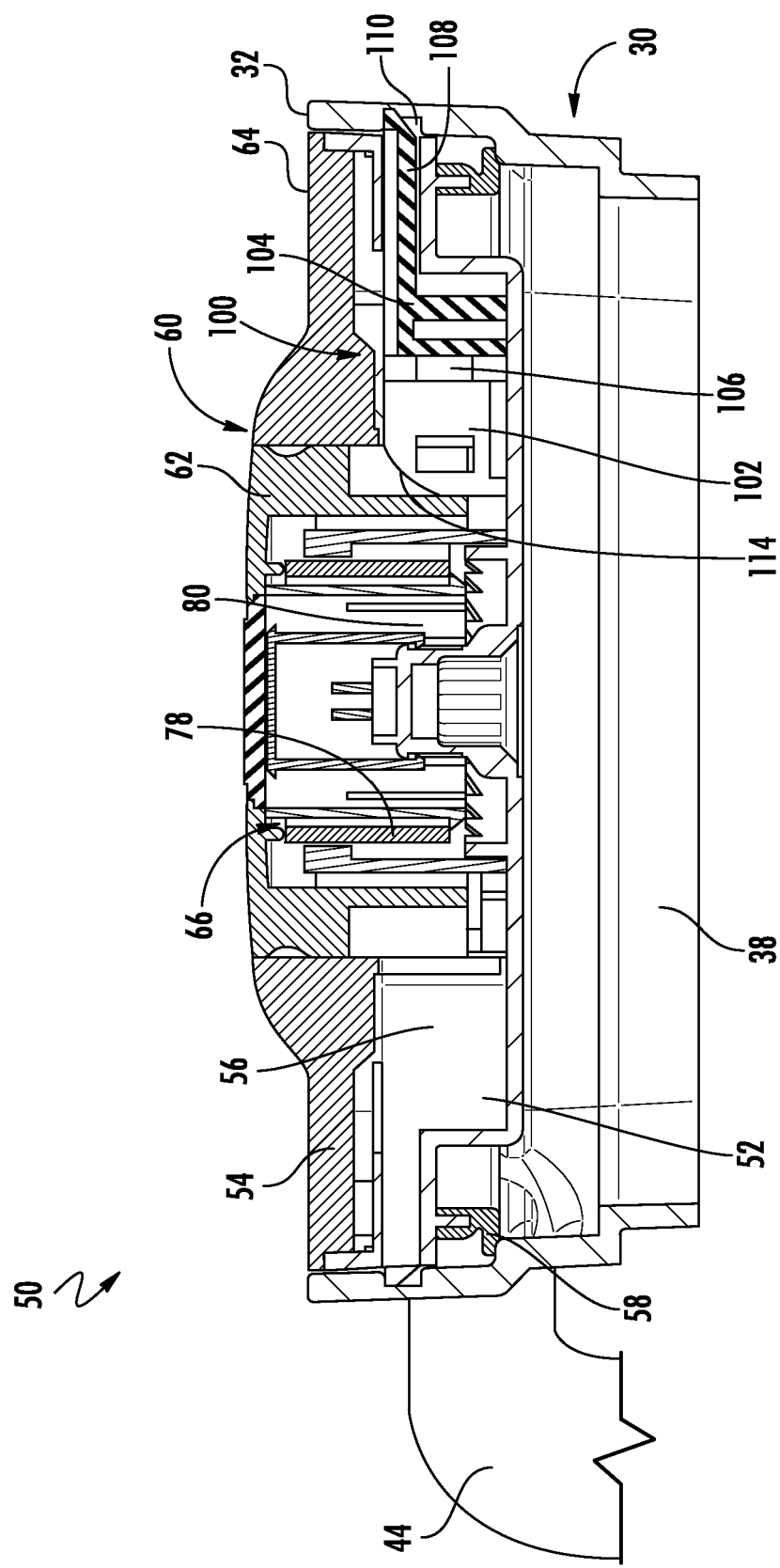
FIG. 4 is a cross-sectional view of a lid having a locking assembly according to another embodiment.
Figure 5:
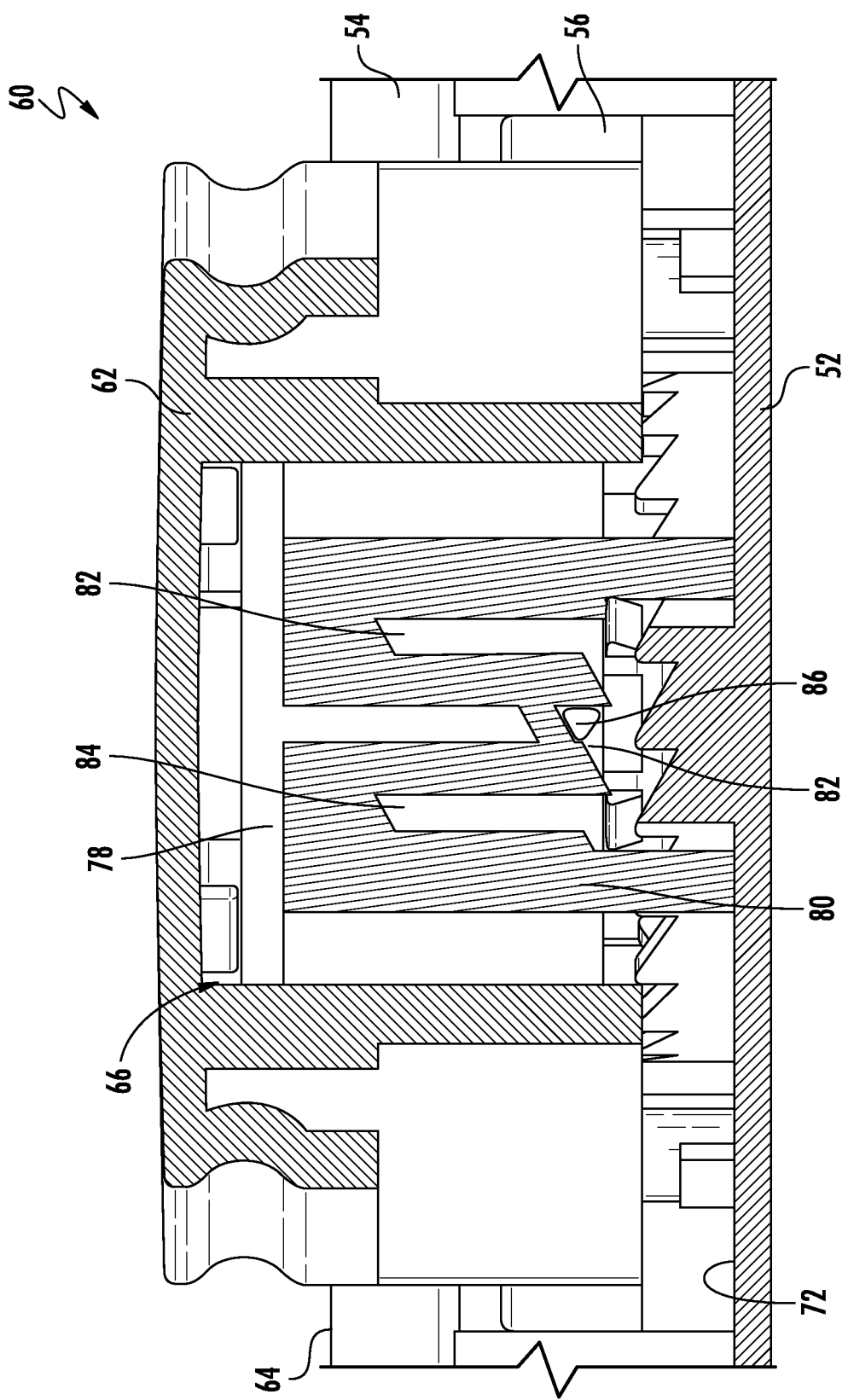
FIG. 5 is a detailed partial cross-sectional view of the button and mechanism of the locking assembly of the lid in FIG. 4.
Figure 6:
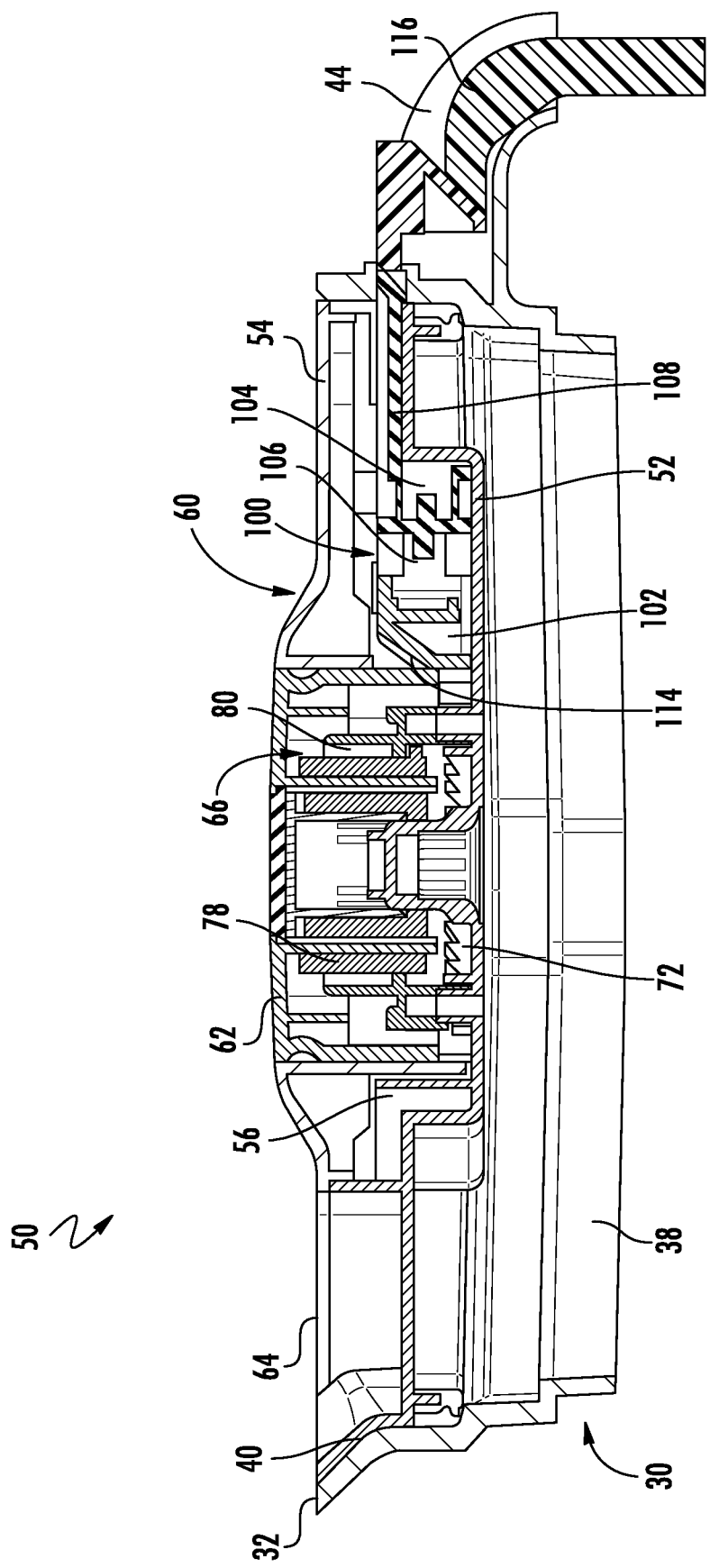
FIG. 6 is another cross-sectional view of a lid having a locking assembly according to an embodiment.

With reference now to FIGS. 4-6, another example of the mechanism 66 for retaining the button 62 in the actuated position is illustrated. As shown, the mechanism 66 includes a collar 78 located within the hollow interior of the button 62 and includes an indexer 80 mounted to the surface 72 of the lower housing 52 adjacent to the collar 78. In an embodiment, the indexer 80 is arranged concentrically with the collar 78. The collar 78 is configured to rotate relative to the button 62 about an axis defined by the collar 78. The indexer 80 defines a plurality of distinct positions 82 connected by a passage 84. In an embodiment, the positions 82 have an alternating high configuration and low configuration about the periphery of the indexer 80. At least one tooth 86 extending from the collar 78 is received within the passage 84 of the indexer 80.

The locational difference between the high configuration and the low configuration causes the button 62 to translate relative to the upper surface 64 between the actuated and unactuated positions. For example, when the tooth 86 is located at a high configuration defined in the indexer 80, the button 62 is in the unactuated position, and when the tooth 86 is located at a low configuration of the indexer 80, the button 62 is in the actuated position. Application of a generally vertical force to the button 62 causes the collar 78 to rotate relative to the button 62 and the indexer 80 such that the tooth 86 of the collar 78 rotates to the next defined position 82. Accordingly, a generally vertical force is operable to both actuate and release the button 62.

Figure 7:
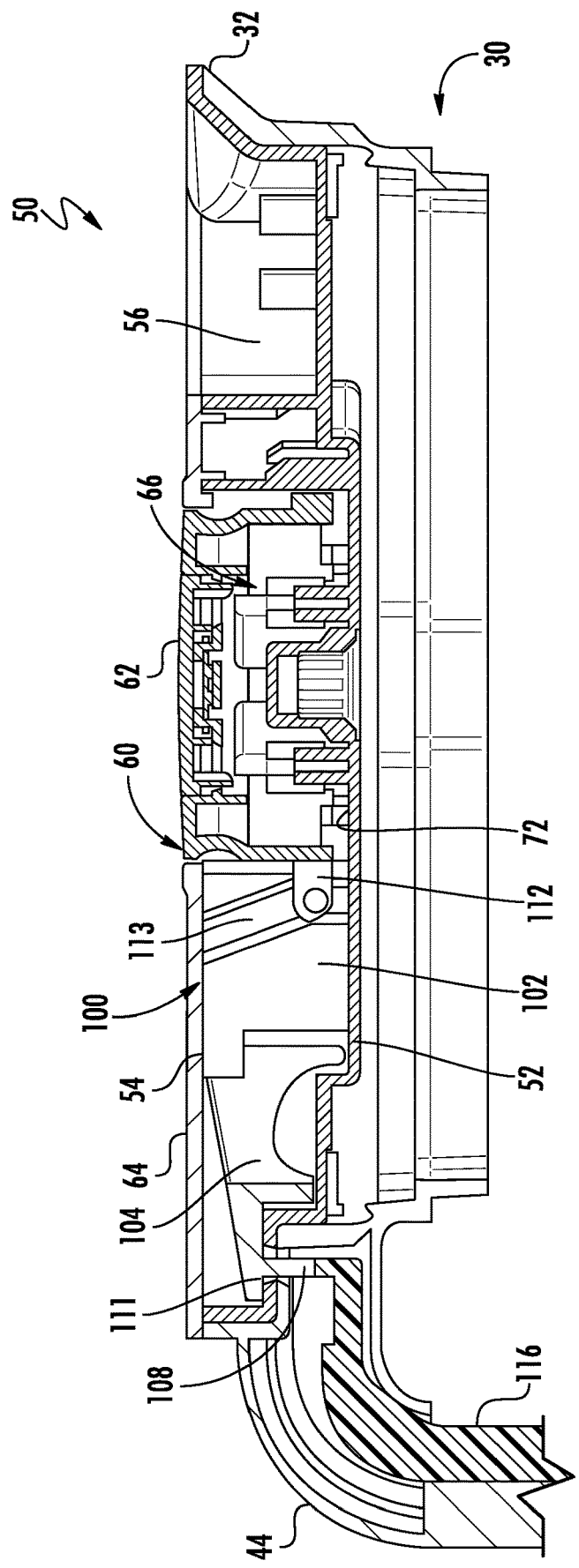
FIG. 7 is another cross-sectional view of a lid having a locking assembly according to an embodiment.
Figure 8:
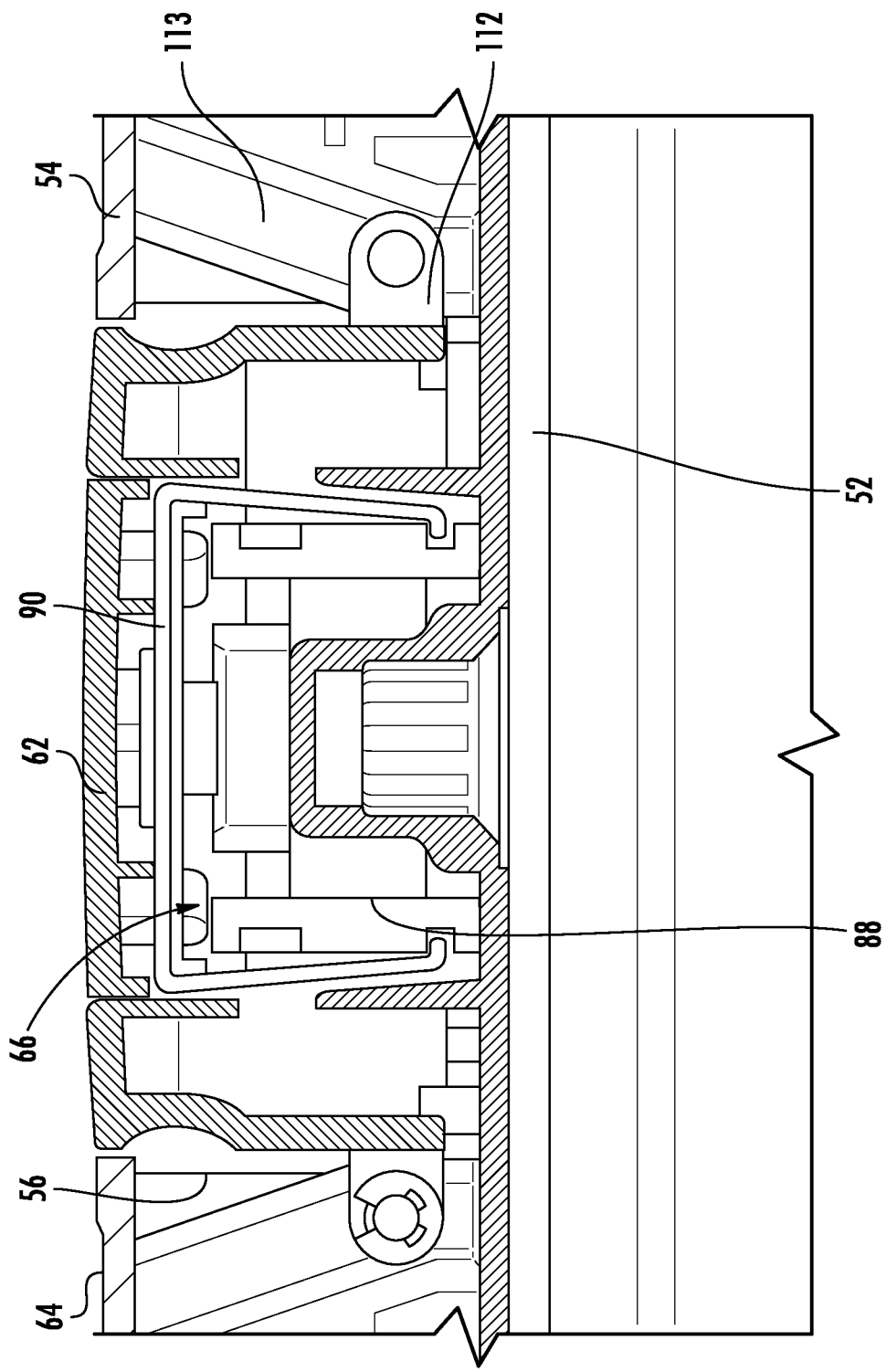
FIG. 8 is a detailed cross-sectional view of a mechanism of the locking assembly of FIG. 7 according to an embodiment.
Figure 9:
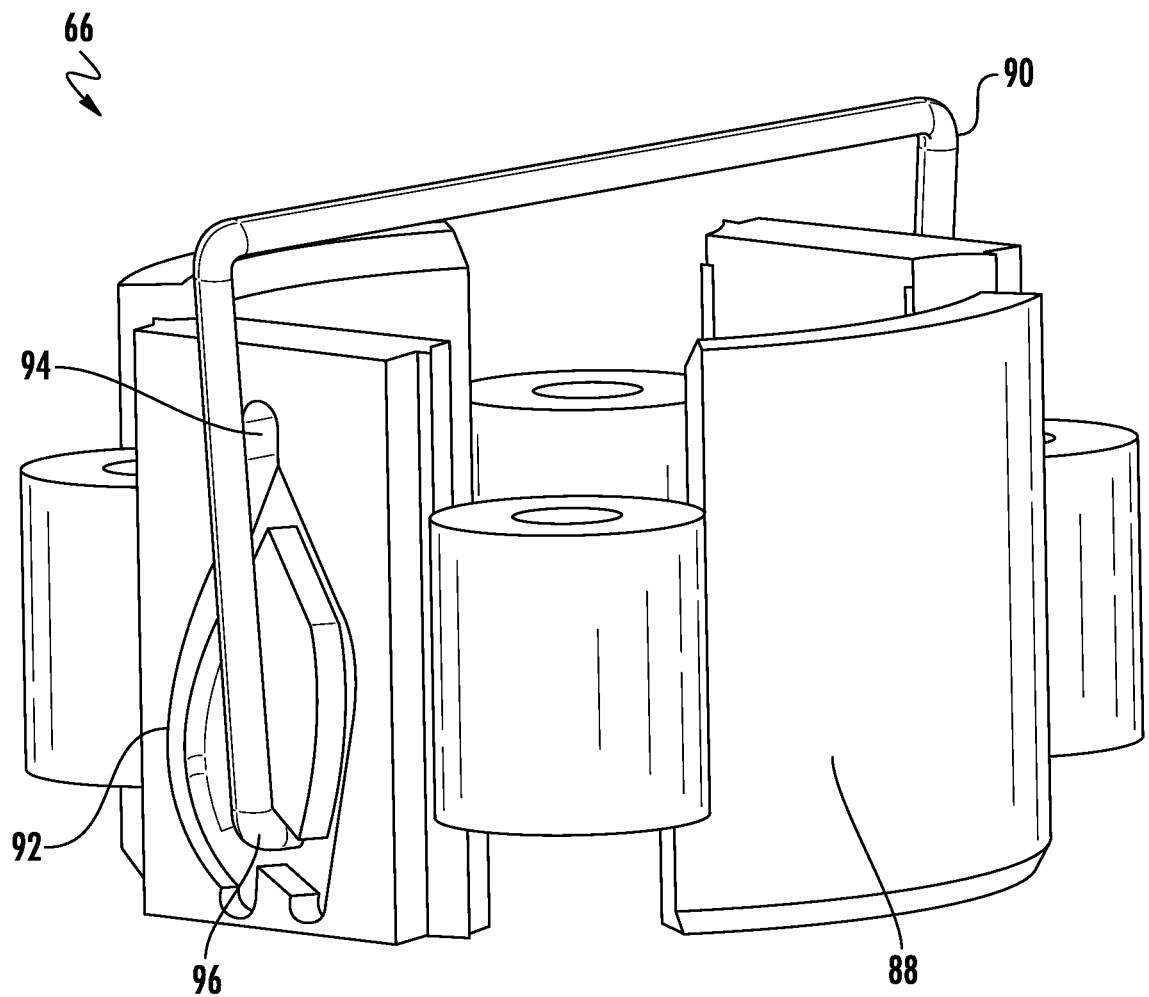
FIG. 9 is a perspective view of a mechanism of the locking assembly of FIGS. 7 and 8 according to an embodiment.
Figure 10:
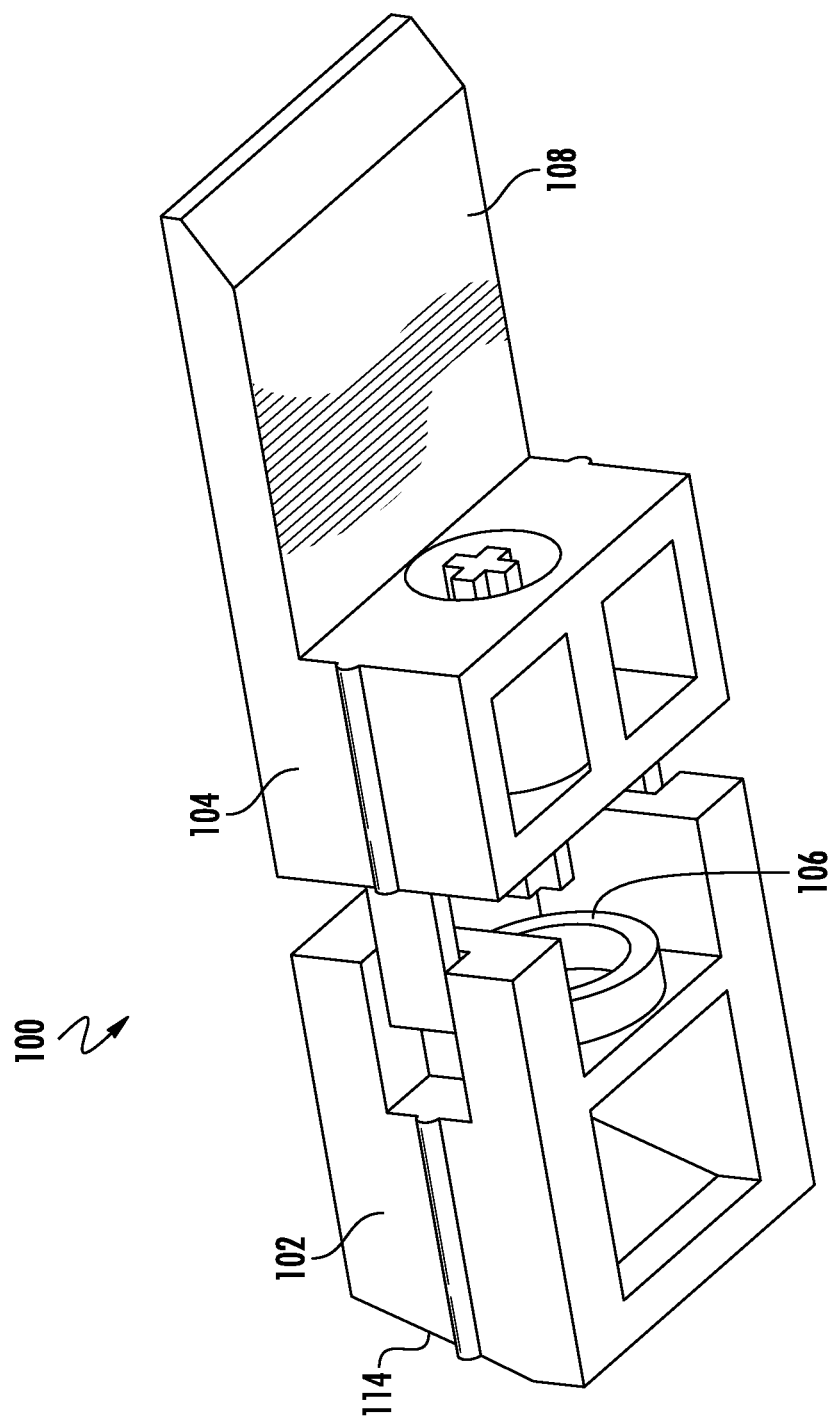
FIG. 10 is a perspective view of a lock of the locking assembly according to an embodiment.

Yet another example of the mechanism 66 is shown in the non-limiting embodiment of FIGS. 7-9. As shown, the mechanism 66 includes an indexer 88 mounted to a surface 72 of the lower housing 52. A wire 90 coupled to the indexer 88 is affixed to a portion of the button 62. The wire 90 is movable along a predefined path 92 formed in the indexer 88 between a first high position 94 and a second low position 96. When a generally vertical downward force is applied to the unactuated button 62, the wire 90 moves along the path 92 from the first high position 94 towards the bottom of the indexer 88. Upon release of the force, a biasing mechanism (not shown) associated with the button 62 and/or the wire 90, causes the wire 90 to bias into the second low position 96. When another generally vertical downward force is applied to the button 62, now in the actuated position, the wire 90 is disengaged from the second position 96 and as a result of the biasing force of the biasing mechanism, follows the path 92 until reaching the first high position 94. It should be understood that the various mechanisms 66 illustrated and described herein are intended as examples only, and that any suitable mechanism 66 for selectively retaining the button 62 in the actuated position is within the scope of the disclosure.

The locking assembly 60 includes at least one lock 100 configured to cooperate with the button 62 to selectively lock the lid 50 to the container 30. An example of a lock 100 is shown in more detail in FIG. 10. In the illustrated, non-limiting embodiment, the lock 100 includes a first portion 102 and a second portion 104 coupled by a biasing mechanism 106, such as a coil spring for example. In an embodiment, the second portion 104 of the lock 100 includes an elongated engagement member 108 extending in a direction away from the first portion 102. When the lid 50 is coupled to the container 30, the distal end of the engagement member 108 is receivable within an opening or pocket 110 formed in a sidewall 38 of the container 30. By connecting the first portion 102 and the second portion 104 of the lock 100 with the biasing mechanism, the lid 50 may already be in a locked configuration when coupled to the container 30.

Figure 11A:
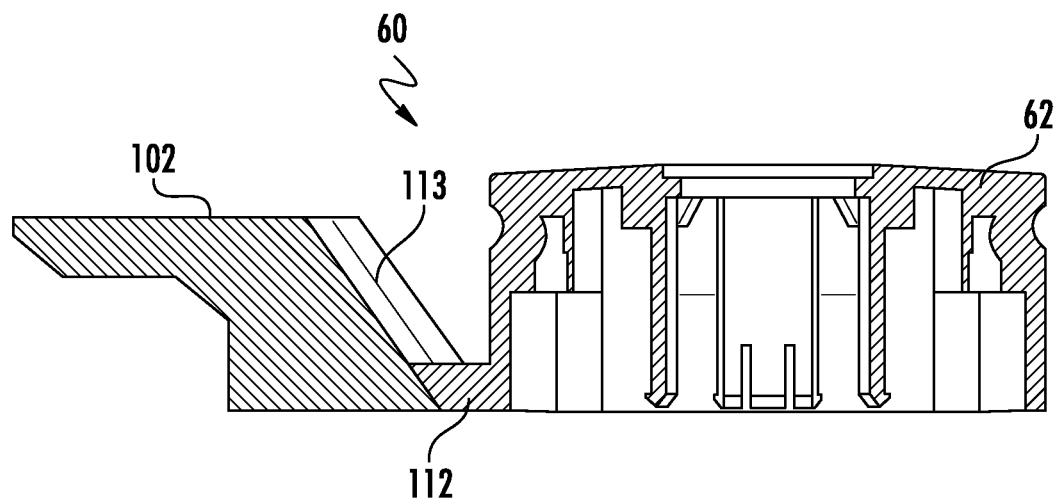
FIGS. 11A and 11B are cross-sectional view of a portion of a locking assembly in an actuated and an unactuated position according to an embodiment.
Figure 11B:
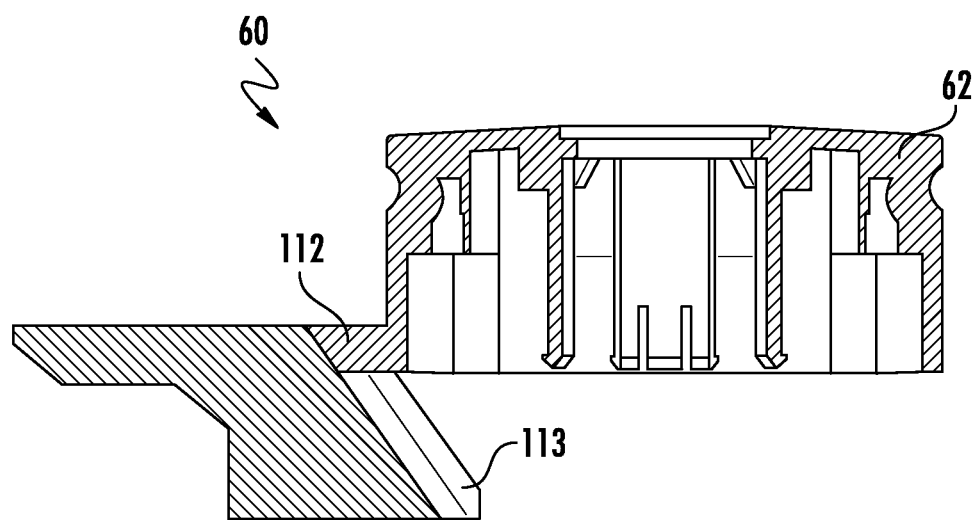

The lock 100 is positioned within the lid cavity 56 such that the first portion 102 of the lock 100 is generally adjacent to the button 62. As shown, the first portion 102 of the lock 100 is separate from the button 62. However, other embodiments, such as shown in FIGS. 11a and 11b, where the lock 100 is directly coupled to a portion of the button 62 are also contemplated herein. For example, as shown, a tab 112 extending from the button 62 may be slidably received within a channel 113 formed in the first portion of the lock 100.

With reference again to FIG. 10, as the button 62 moves from an unactuated to the actuated position, the button 62 contacts and applies a force to the lock 100. The direction of movement of the button 62 and the direction of the force applied by the button 62 to the lock 100 are generally perpendicular. In the illustrated, non-limiting embodiment, at least one of the portion of the button 62 configured to contact the lock 100 and the surface 114 of the first portion 102 of the lock 100 engaged by the button 62 is generally angled. As a result, the force applied by the button 62 to the lock 100 causes the lock 100 to translate within the lower housing 52 causing the elongated engagement member 108 to extend into the pocket 110 of the container 30.

In an embodiment, a lock 100 may also be configured to operate an interlock of the food processing system 20. As shown in the non-limiting embodiment of FIG. 6, an interlock 116 movable to activate a switch (not shown) and deliver power to the motorized unit of the system 20 is arranged within a portion of the container 30, such as in a handle 44 thereof for example. The opening 110 may be formed in the handle 44 such that when the lid 50 is coupled to the open end 32 of the container 30, the engagement member 108 is generally oriented towards the handle 44. Actuation of the button 62 causes the lock 100 to slide relative to the lower housing 52 and the engagement member 108 to extend through the opening 110 and contact the interlock 116 or a link coupled to the interlock 116. In such embodiments, the horizontal force applied by the engagement member 108 to the interlock 116 is translated into vertical movement of the interlock 116. This vertical motion applies a force to close the switch (not shown), thereby completing a circuit for supplying power to the motorized unit.

In another embodiment, illustrated in FIG. 7, the lock 100 configured to operate the interlock 116 of the food processing system 20 includes a first portion 102 and a second portion 104 rotatably coupled to one another. In such embodiments, actuation of the button 62 causes the first portion 102 of the lock 100 to slide relative to the lower housing 52. The sliding motion of the first portion 102 is configured to apply a rotational force to the second portion 104, causing the engagement member 108 of the lock 100 to rotate through the opening 110 formed in the container 30 and into contact with the interlock 116 or a link coupled to with the interlock 116. The locks 100 configured to interact with the interlock 116 described herein are intended as an example only and other configurations are also within the scope of the disclosure.

Figure 12:
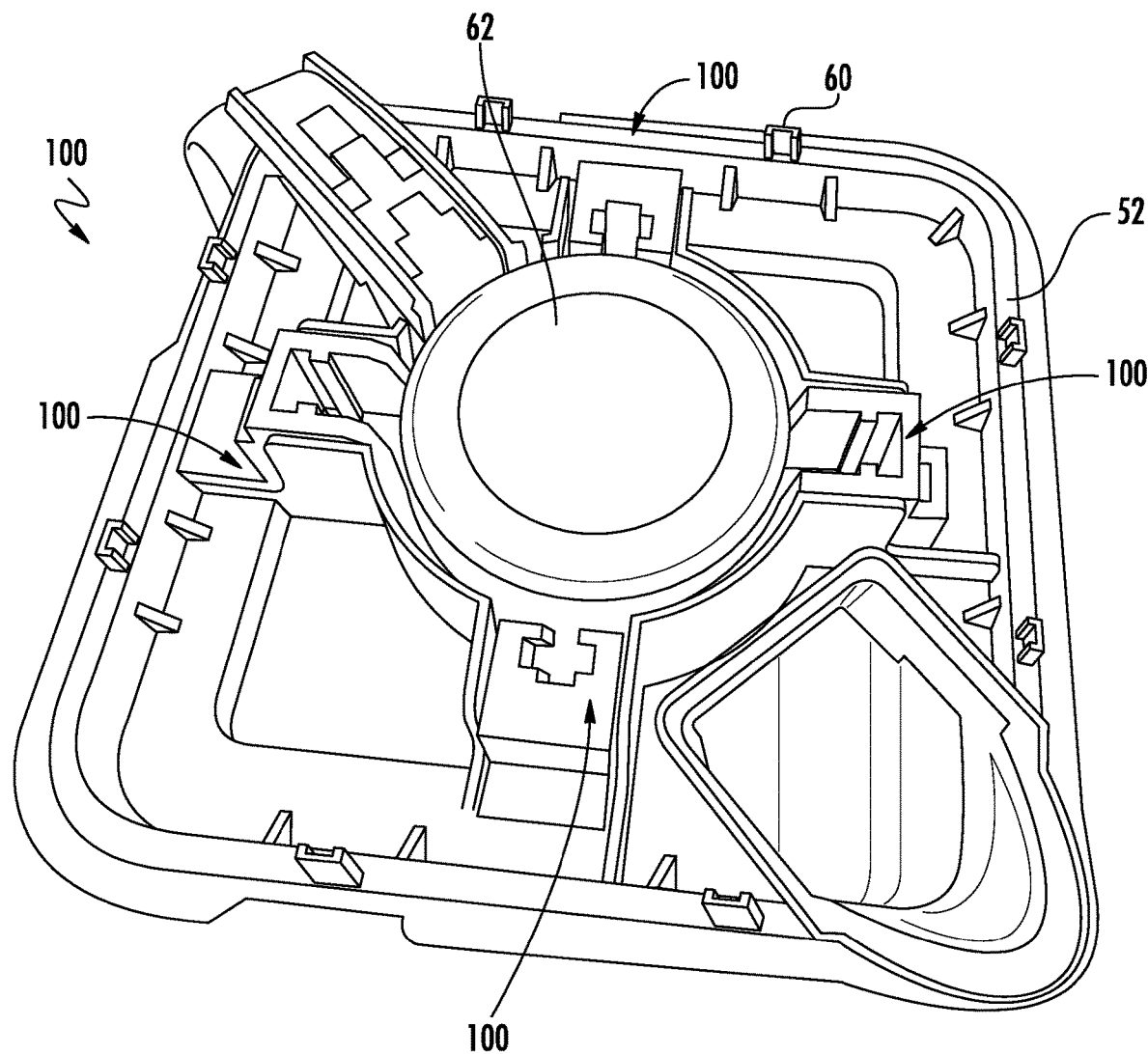
FIG. 12 is a perspective view of a portion of a lid having a locking assembly according to an embodiment.
Figure 13:
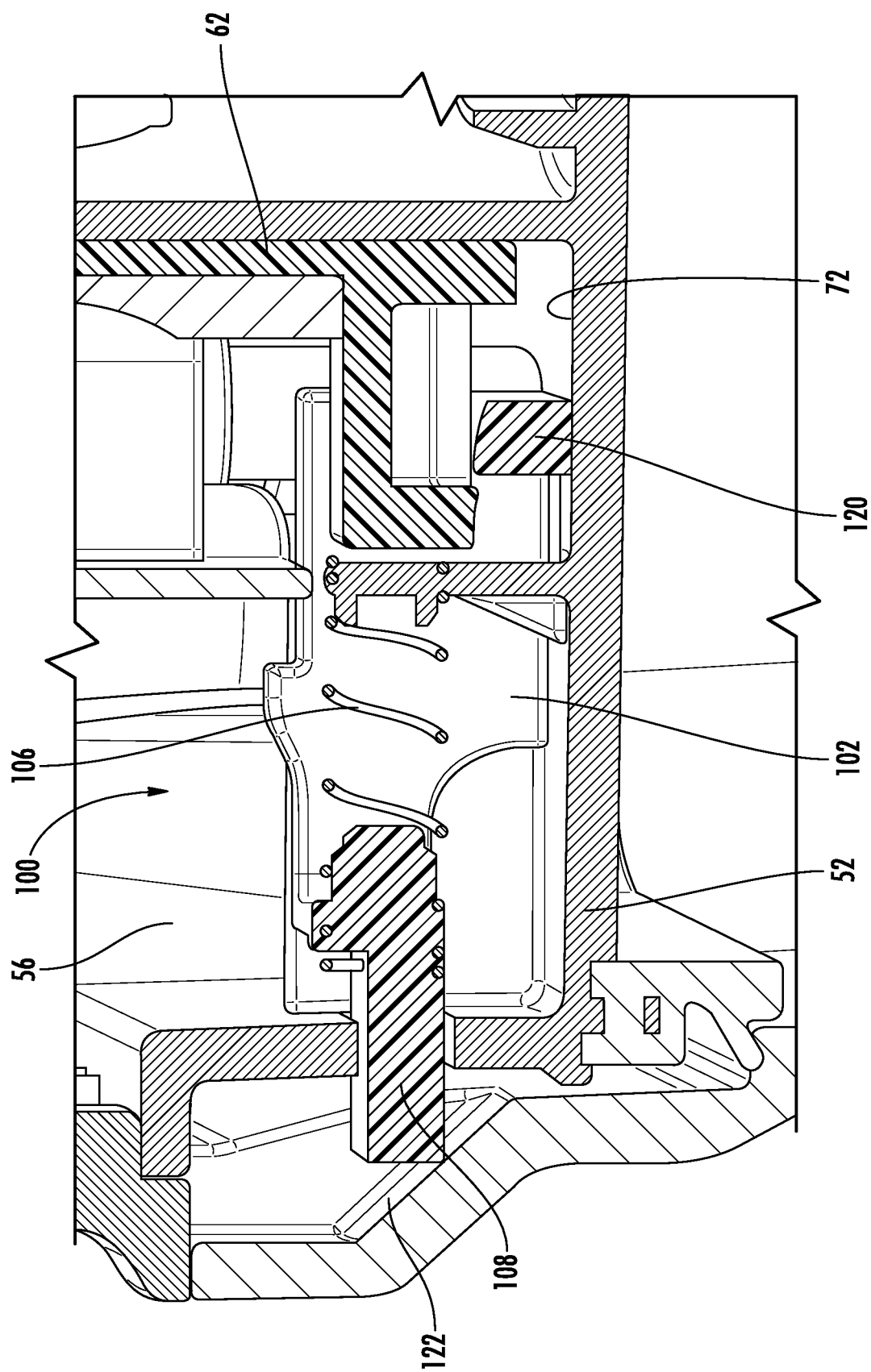
FIG. 13 is a cross-sectional view of a lock of a locking assembly according to an embodiment.

With reference now to FIGS. 12 and 13, the locking assembly 60 may include a plurality of locks 100 associated with the button 62. The plurality of locks 100 may be substantially identical, or alternatively, may vary. In the non-limiting embodiment of FIG. 13, at least one of the locks 100 of the locking assembly 60 is a poka-yoke lock configured to prevent the locking assembly 60 from being locked unless the lid 50 is coupled to the container 30 in a desired orientation. As shown, the lock 100 includes body 102 having an elongated engagement member 108. A biasing mechanism 106 is positioned between a portion of the body 102 and a corresponding portion of the lower housing 52. The biasing mechanism 106 is configured to bias the body 102 into an extended position where the elongated engagement member 108 extends outwardly from the lid 50. The body 102 additionally includes a button stop 120 configured to cooperate with a portion of the button 62 to control movement of the button 62 between the unactuated and actuated positions. When the body 102 is in the biased position, the button stop 120 is in contact with the button 62 to restrict movement of the button 62. When the body 102 is translated inwardly, the button stop 120 is moved out of engagement with the button 62, thereby allowing actuation of the button 62.

A portion of the container 30 generally adjacent the poka-yoke lock 100 includes a feature 122, such as a ramp surface for example, configured to cooperate with the engagement member 108 of the body 102. The interaction between the ramp surface 122 and the engagement member 108 gradually forces the lock body 102 to a retracted position. Only when the lid 50 is installed to the container 30 in a correct orientation does the feature 122 apply the necessary force to the engagement member 108 to move the body to a position allowing the button 62 to be actuated.

The food processing system illustrated and described herein relies on a single mechanism motion not only to lock the lid 50 to the container 30, but also to engage the interlock 116. Further, the same mechanical motion is relied upon to unlock the lid. This singular point of interaction is more intuitive, does not have a bias, requires low activation forces, which in combination create an enhanced, more user-friendly experience.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. A lid of a food processing system, the lid being selectively receivable by a container of the food processing system, the lid comprising:
   a lid body defining a cavity within said lid body;
   a locking assembly at least partially disposed within said cavity, the locking assembly including at least one lock;
   an actuator associated with said lid body and said at least one lock of said locking assembly;
   wherein said locking assembly is movable from an unlocked position to a locked position in response to application of a first force applied to said actuator,
   wherein said locking assembly is movable from said locked position to said unlocked position in response to application of a second force applied to said actuator, said first force and said second force being applied in a same direction; and
   wherein said locking assembly is in said locked position, an engagement member of said at least one lock extends beyond said lid and is receivable within an opening formed in a sidewall of the container.

2. The lid of claim 1, wherein said locking assembly is spring biased towards said unlocked position.

3. The lid of claim 1, wherein said locking assembly further comprises at least one lock operably coupled to said actuator.

4. The lid of claim 3, wherein application of said first force and said second force causes said actuator to move about a first axis and said at least one lock to move about a second axis, said second axis being different than said first axis.

5. The lid of claim 4, wherein said first axis and said second axis are substantially perpendicular.

6. The lid of claim 4, wherein said at least one lock is configured to rotate about said second axis.

7. The lid of claim 3, wherein when said lid is mounted to the container, said at least one lock is engagable with an interlock of the food processing system.

8. The lid of claim 3, wherein when said locking assembly is in said unlocked position, said actuator is offset from an upper surface of housing by a first distance and when said locking assembly is in said locked position said actuator is offset from said upper surface of said housing by a second distance, said first distance being greater than said second distance.

9. The lid of claim 1, lid further comprising a mechanism for selectively retaining said actuator when said locking mechanism is in said locked position.

10. The lid of claim 1, wherein said lid is receivable by the container when said locking assembly is in both a locked position and an unlocked position.

\* \* \* \* \*